United States Patent [19]

Goodman

[11] Patent Number: 5,212,589
[45] Date of Patent: May 18, 1993

[54] LENS SYSTEM FOR FOCUSSING LIGHT OF PLURAL WAVELENGTH

[75] Inventor: Douglas S. Goodman, Yorktown Heights, N.Y.

[73] Assignee: International Business Machines Corporation, Armonk, N.Y.

[21] Appl. No.: 782,944

[22] Filed: Oct. 25, 1991

[51] Int. Cl.⁵ .................... G02B 13/14; G02B 3/00; G02B 9/12

[52] U.S. Cl. .................... 359/353; 359/355; 359/723; 359/724; 359/740; 359/784; 359/799; 359/800

[58] Field of Search ............... 359/350, 353, 355, 722, 359/723, 724, 739, 740, 784, 785, 789, 790, 792, 798, 799, 800, 400, 419, 420

[56] References Cited

U.S. PATENT DOCUMENTS

| | | | |
|---|---|---|---|
| 2,409,186 | 10/1946 | Bouwers | 359/420 |
| 2,550,685 | 5/1951 | Garutso | 359/724 |
| 2,591,535 | 4/1952 | Garutso | 359/724 |
| 2,651,237 | 9/1953 | Garutso | 359/724 |
| 3,572,886 | 3/1971 | Curtiss et al. | 359/420 |
| 4,256,370 | 3/1981 | Gold | 359/724 |
| 4,376,889 | 3/1983 | Swift | 250/213 VT |
| 4,626,079 | 12/1986 | Nakamura et al. | 359/387 |

FOREIGN PATENT DOCUMENTS 258755 9/1926 United Kingdom .................... 88/57

*Primary Examiner*—Bruce Y. Arnold
*Assistant Examiner*—David R. Parsons
*Attorney, Agent, or Firm*—John J. Goodwin

[57] ABSTRACT

A lens system having discrete variations of focal length at discrete distances of radius outward from the optic axis for focussing light of plural wavelengths. The lens system which directs a laser beam onto a target for ablation or exposure applications includes one set of lens elements to handle short wavelength light used for ablation or exposure applications, and another set of lens elements to handle long wavelength light used for alignment applications. The lens system which provides for the ablation or exposure functions at short wavelength and for through-the-lens alignment at a longer wavelength and higher numerical aperture consists of three elements. Two outer lens elements are made entirely of fused quartz. An inner element disposed between the two outer lens is composed of any material such as optical glass. The inner lens element has a hole ground through its center.

6 Claims, 1 Drawing Sheet

LENS SYSTEM FOR FOCUSSING LIGHT OF PLURAL WAVELENGTH

BACKGROUND OF THE INVENTION

1. Field of the Invention

The present invention relates to optical systems, and more particularly to a lens system for plural wavelength light including a first lens group for exposure and/or ablation use and a second lens group for through-the-lens alignment use.

2. Description of the Prior Art

U.S. Pat. No. 2,550,685, issued May 1, 1951 to S. E. Garutso, entitled OPTICAL OBJECTIVE BALANCE ASSEMBLY, discloses the addition of specially constructed lens elements to known objective lenses or by lens assemblies of entirely new composition. The lenses, with a wide open diaphragm, will give sharp images simultaneously of objects from forty inches on to optical infinity and the horizon. This is accomplished without creating double images, distortion or fuzziness and with a marked three-dimensional effect much more striking than heretofore observed in one-lens pictures.

U.S. Pat. No. 2,591,535, issued Apr. 1, 1952 to S. E. Garutso, entitled BALANCED OPTICAL OBJECTIVE AND FOCUSSING LENS ASSEMBLY, discloses lenses for use in cameras or wherever depth of focus and fidelity of image are important, and its object is to improve these qualities in lenses used for such purposes. A plurality of annular lenses having non-parallel, spherical optical surfaces are coaxially positioned in front of a conventional objective and at least one of the annular lenses has an external diameter equal to that of the conventional objective and at least one other of the annular lenses has an external diameter greater than the internal diameter of the first annular lens and less than the diameter of the conventional objective and the second annular lens having an internal diameter less than that of the first annular lens.

U.S. Pat. No. 2,651,237, issued Sep. 8, 1953 to S. E. Garutso, entitled BALANCED FOCUS LENS SYSTEM, relates to lenses such as the objectives of cameras and other optical instruments where a correct image of objects or scenes is desired, and its object is to increase the depth of focus, improve the fidelity of the image and decrease distortion by combining with a known type of lens, one or more annular converging lens elements called balancing elements and which overlie the peripheral part of the elements of the conventional lens.

With full diaphragm opening, any required depth of focus within wide limits depending upon the character of the conventional lens used, can be attained by combining with it annular balancing lens elements each having the central opening or non-refractive area such that its effective diameter is in the region of ⅝ of the diameter of the cone of rays transmitted by the conventional lens, measuring at the point where the balancing element is located.

The three Garutso patents are directed to lens systems for photography for viewing at different distances with the same wavelength. The present invention is a lens system for different wavelengths at the same distance.

U.S. Pat. No. 4,256,370 issued Mar. 17, 1981 to Gold, entitled CORED LENS FOR LARGE REFRACTING TELESCOPES describes a refracting telescope which is comprised essentially of an objective lens and an eyepiece is provided with a cored or annular lens for the objective lens thereby increasing the resolving power of the telescope without adversely affecting the light gathering capabilities of the telescope.

U.S. Pat. No. 4,626,079 issued Dec. 2, 1986 to Nakamura et al, entitled DARK FIELD ILLUMINATION APPARATUS FOR EPI-ILLUMINATION SYSTEM describes a dark field illumination apparatus for epi-illumination system, an annular light beam which is coaxial with the optical axis of the objective lens and is supplied along an optical path formed surrounding the objective lens. An annular condenser member is arranged near the object side end of the objective lens in such manner that the beam reaches the objective surface while being concentrated in the direction toward the optical axis by the condenser member.

U.S. Pat. No. 4,376,889 issued Mar. 15, 1983 to Swift, entitled LOW LIGHT LEVEL VISION APPARATUS, relates to low light level or night vision apparatus, and particularly goggles having an objective lens to focus incident light on to an image intensifier and a magnifier enabling an observer to view a magnified version of the intensified image includes a wavelength selective filter with a hole or aperture through which light of other wavelenhths can pass, the wavelength selective filter or means associated with the hole or aperature being arranged to have a focussing effect so that light from a distant scene or object of a wavelength passed by the filter can be properly focussed on the image intensifier, and light from a near scene or object passing through the hole or aperture can simultaneously also be properly focussed on the image intensifier, so that either or both images can be viewed in a focussed condition without adjustment of the apparatus.

United Kingdom Patent 258,755 issued Sep. 30, 1926 to Parodi, entitled IMPROVEMENTS IN AND RELATING TO PERISCOPES, describes an improved periscope with two toric lenses equal and symmetrically arranged each at one end of a vertical optical fixed tube with converging lenses arranged between the two toric lenses.

The Gold patent relates to annular lenses only for purposes of resolution and weight reduction. The Nakamura patent relates to annular lenses used for illuminations, not alignment. The Swift patent is for night vision at different distances and the Parodi patent relates to panoramic viewing.

SUMMARY OF THE INVENTION

An object of the present invention is to provide a lens system having discrete variations of focal length at discrete distances of radius outward from the optic axis for focussing light of plural wavelengths.

Another object of the present invention is to provide a lens system for directing an illumination beam onto a workpiece for ablation or exposure including one set of lens elements to handle the short wavelength light used for ablation or exposure applications, and another set of lens elements to handle long wavelength light used for alignment applications.

Still another object of the present invention is to provide a lens system for directing an illumination beam onto a workpiece which provides higher numerical aperture and better resolution with longer wavelengths of light.

DESCRIPTION OF A PREFERRED EMBODIMENT

For high-power UV laser applications, such as excimer ablation, a refractive imaging system is limited. An imaging system made entirely of fused quartz is preferable because it is durable, workable and is one of the few materials that is transparent enough in the UV region. In many cases, through-the-lens alignment at a longer wavelength is desired. Two-wavelength correction requires the use of a second optical material, such as glass, but glasses are browned by UV radiation, destroying the alignment system. Other available UV materials have indices of refraction close to that of quartz, so it is hard to correct for chromatic aberration, even if several materials are used. Also, with laser light, chromatic correction is not needed, so use of a single material simplifies the lens.

Furthermore, in general, alignment accuracies must be a fraction of resolution. Therefore, especially with alignment at longer wavelengths above the UV region, a higher numerical aperture is desirable for alignment.

Figure 1:
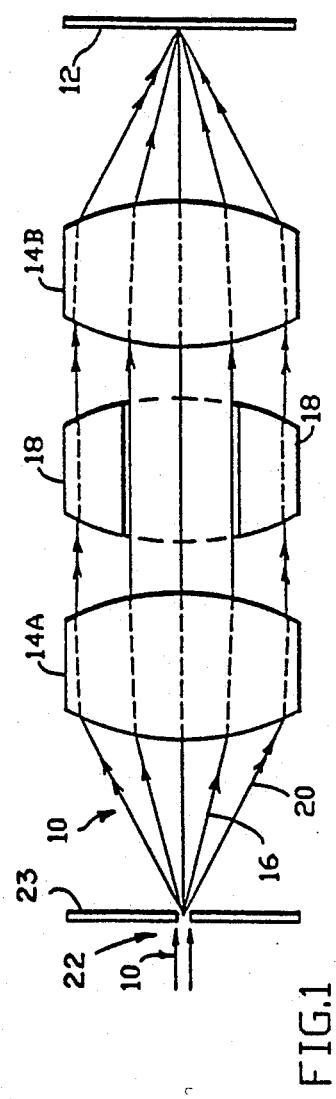
FIG. 1 is a schematic illustration of the cross section of a lens system according to the principles of the present invention.

Referring to FIG. 1, a lens system is illustrated having discrete variations of differing focal length at discrete distances of radius outward from the optic axis for focussing light of plural wavelengths. More particularly, FIG. 1 shows a lens system for directing illumination from a suitable source such as a light beam 10 from a laser onto a workpiece 12 for ablation, exposure, or the like applications wherein one set of lens elements 14A, 14B alone handle the short wavelength light 16 used for ablation purposes and another lens element 18 in combination with lens elements 14A and 14B, handles long wavelength light 20 used for alignment functions.

In FIG. 1, the ray 16 represents the outer rays accepted by elements 14A and 14B. In FIG. 1, ray 20 represents the outer rays accepted by elements 14A, 14B and 18. Also, light beam 10 may or may not be collimated, therefore the diffraction angles represented by the innermost and outermost rays 16 and 20 may be due to the natural diffraction of the light beam, diffraction due to an aperture 22 in a mask 23 through which light beam 10 passes, or combination of both. Also, different wavelengths could hit mask 23 at different angles or from different sides.

The light beam 10 of FIG. 1 may be composed of a combination of long wavelength light (i.e., ray 20) and short wavelength light (i.e., ray 16) or may be composed of either long wavelength or short wavelength light separately.

The lens of FIG. 1 which provides for the ablation or exposure functions at short wavelength and for through-the-lens alignment at a longer wavelength and higher numerical aperture consists of three elements. The outer two elements 14A, 14B are made entirely of fused quartz. The inner element 18 is composed of any suitable material such as optical glass and could also be composed of quartz. The lens element in 18 has a hole ground through its center.

Figure 2:
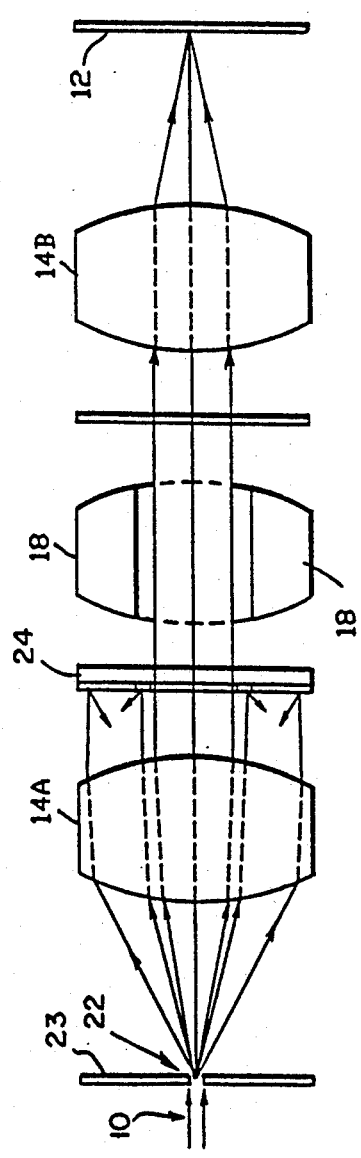
FIG. 2 is a schematic illustration of the lens system of FIG. 1 further including an apertured filter plate located between lens elements.
Figure 4:
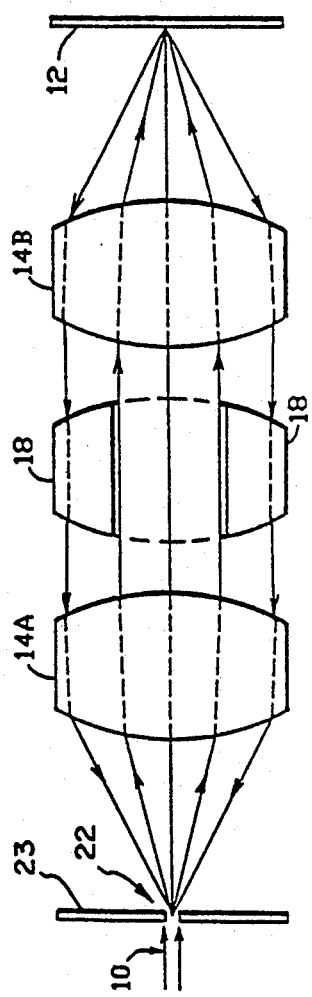
FIG. 4 is a schematic illustration of the lens system of FIG. 1 wherein dark field illumination is provided for alignment along the lens system axis.

A light beam 10 which includes short and/or long wavelength light from a suitable source such as an excimer laser is passed through an aperture 22 or any pattern of apertures of a mask 23. The short wavelength light represented by ray 16 used for ablation or exposure functions is imaged at image plane 12 by the quartz lenses 14A, 14B only. The long wavelength alignment light represented by ray 20 is imaged onto image plane 12 by the quartz lenses 14A, 14B and also the donut lens 18. In order to protect the donut lens 18 from browning, and to eliminate a degradation of the short wavelength imaging by light that would pass through the donut lens 18, a filter 24 may be included, as shown in FIG. 2. Filter 24 is located in the path of the light before the lens 18,, between lens 14A and lens 18 as shown, or may be located between mask 23 and lens 14A. This apertured filter plate 24 may also define the apertures for both imaging channels. Such a plate would use dielectric coatings transmitting at the short wavelength in the center, and at long wavelengths on the outside. An annular band disposed between the dielectric coating would reflect at all wavelengths in order to define the apertures. The annular band could also be a metallic coating or a piece of metal or other material, in which case, it would not have to be deposited with the inner and outer coatings.

Figure 3:
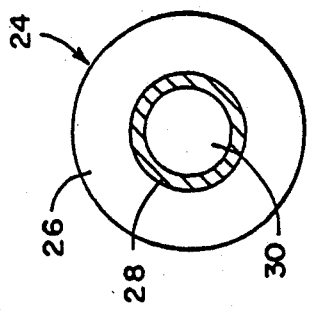
FIG. 3 is a schematic illustration of the apertured filter plate included in the lens system of FIG. 2.

In FIG. 3, a short wavelength dielectric coating 30 for filter plate 24 and a long wavelength dielectric coating 26 are shown. Since the alignment image is formed by the outer annulus 26, dark field illumination can be provided for alignment along the axis. Region 28 in FIG. 3 provides reflectance at both short and long wavelengths. Coating 30 transmits short and reflects long wavelengths while coating 26 transmits long and reflects short wavelengths.

In the previous discussion, the terms "long wavelength" and "short wavelength" light were used. Although the particular wavelengths of the light used in the present invention will depend on the desired application, a typical example of a short wavelength light would be light with a wavelength of 307 to 309 nanometers, and a long wavelength light would be light with a wavelength of 545 to 547 nanometers. Both such long and short wavelength light can be provided by suitable lasers.

Although lens element 18 has been shown in the embodiment of FIG. 1 as a toroid such that the short wavelength light passes through the center opening, it is also possible to provide another embodiment wherein a center lens element is located only at the location where the "hole" or opening is shown in FIG. 1. In this alternative embodiment, the long wavelength light passes through the center of the outer lens elements and also through the smaller diameter center lens element. The short wavelength light passes through the periphery of the outer lens elements only and does not pass through the center lens element.

One skilled in the optics art will appreciate that although lens elements 14A, 14B and 18 have been shown for explanation as single lenses, that these elements 14A, 14B and 18 may be composed of two or more lens components whose constructions are arbitrary.

Having thus described our invention what we claim as new and desire to secure as Letters Patent, is:

1. A lens system for imaging both short and long wavelengths of a beam of plural wavelength illumination onto an image plane comprising:
   an optical mask having an aperture therein disposed in the path of a beam of illumination for passing said beam of illumination through said aperture,
   a set of first and second lens elements disposed on an optical axis in the path of said illumination passing through said aperture and a third lens element disposed on said optical axis and located between said first and second lens elements,
   said first and second lens elements functioning in combination to focus a first type plurality of wavelengths of said illumination onto said image plane,
   said first, second and third lens elements functioning in combination to focus a second type plurality of wavelengths of said illumination onto said image plane.

2. A lens system according to claim 1 wherein said illumination is light and said first and second lens elements function in combination to focus short wavelengths of said light onto said image plane, and said first, second and third lens elements function in combination to focus long wavelengths of said light onto said image plane.

3. A lens system according to claim 2 wherein said first and second lens elements are lenses having center regions in the path of said short wavelengths of said light to focus said short wavelengths of light onto said image plane, and said first and second lens elements having peripheral regions surrounding said center regions in the path of said long wavelengths of light to focus said long wavelengths of light onto said image plane, and wherein said third lens element is a toroid shaped lens having an opening in the center thereof to pass said short wavelengths of light without focussing, and peripheral regions surrounding said opening in the path of said long wavelength of light to function in combination with said first and second lens elements to focus said long wavelengths of light onto said image plane.

4. A lens system according to claim 3 further including an apertured filter plate element disposed between said aperture and third lens element for protecting said third lens element said apertured filter plate containing dielectric coatings thereon for transmitting short wavelengths of said light through the center thereof and for transmitting long wavelengths of light through the periphery thereof.

5. A lens system according to claim 3 wherein said first and second lens elements are composed of fused quartz and said third lens element is composed of optical glass.

6. A lens system according to claim 2 wherein said beam of light passing through said aperture contains both long and short wavelengths of light.

* * * * *